United States Patent
Fang et al.

(10) Patent No.: US 8,274,947 B1
(45) Date of Patent: Sep. 25, 2012

(54) PROVIDING TIMING REFERENCE FOR FEMTO CELL IN WIRELESS COMMUNICATION NETWORKS

(75) Inventors: Yonggang Fang, San Diego, CA (US); Keqiang Zhu, San Diego, CA (US)

(73) Assignee: ZTE (USA) Inc., Morristown, NJ (US)

( * ) Notice: Subject to any disclaimer, the term of this patent is extended or adjusted under 35 U.S.C. 154(b) by 1024 days.

(21) Appl. No.: 12/246,487

(22) Filed: Oct. 6, 2008

Related U.S. Application Data

(60) Provisional application No. 60/977,831, filed on Oct. 5, 2007.

(51) Int. Cl.
*H04Q 7/00* (2006.01)
(52) U.S. Cl. .......... 370/331; 455/517
(58) Field of Classification Search .......... 370/331; 455/517
See application file for complete search history.

(56) References Cited

U.S. PATENT DOCUMENTS

| | | | |
|---|---|---|---|
| 6,208,871 B1 * | 3/2001 | Hall et al. | 455/517 |
| 7,020,179 B2 | 3/2006 | Park | |
| 2009/0034469 A1 * | 2/2009 | Kim | 370/331 |
| 2009/0073951 A1 * | 3/2009 | Matos et al. | 370/342 |

* cited by examiner

*Primary Examiner* — Jianye Wu
*Assistant Examiner* — Wanda Z Russell
(74) *Attorney, Agent, or Firm* — Perkins Coie LLP

(57) ABSTRACT

Apparatus, techniques and systems are described for providing timing reference from acquired wireless communication signals of adjacent cells and synchronizing a base station to a network based on such a timing reference without directly relying on a satellite-based timing reference.

22 Claims, 4 Drawing Sheets

PROVIDING TIMING REFERENCE FOR FEMTO CELL IN WIRELESS COMMUNICATION NETWORKS

PRIORITY CLAIM AND RELATED APPLICATION

This application claims benefit of U.S. Provisional Application No. 60/977,831 entitled "PROVIDING TIMING REFERENCE FOR FEMTO CELL TIMING REFERENCE WITHOUT GPS TIMING SIGNALS" and filed on Oct. 5, 2007, the entire disclosure of which is incorporated by reference as part of the specification of this application.

BACKGROUND

This application relates to wireless communications including wireless communications networks based on Radio Transmission Technologies being developed by 3GPP/3GPP2 organizations.

In various wireless communication networks, the wireless coverage could be divided into many small geographic areas called cells. Depending on the size and capacity, a cell could be categorized as macro cell, micro cell or pico cell. An access network equipment, i.e. Base Station, is usually installed in each cell to serve the access terminals or mobile stations located in the radio coverage region of the base station through wireless connection.

A femto cell is a kind of tiny mobile cell to extend wireless services to homes and business regions. A femto base station (FBS) or Femto Access Point (FAP) is used to provide radio coverage for a femto cell by wirelessly transmitting radio signals to mobile stations or subscriber stations located in the femto cell based on wireless air link standards, such as 3GPP2 or 3GPP specs. The FAP can adopt the home or offices' wired broadband connection, like ADSL or cable modem or on-premise fiber link, as backhaul to connect to the wireless core network. When a mobile station enters a femto cell coverage, the mobile station could switch its connection from macro cell to FAP and continues its wireless service connectivity.

SUMMARY

Apparatus, techniques and systems are described for providing timing reference from acquired wireless communication signals of adjacent cells and synchronizing a base station to a network based on such a timing reference without directly relying on a satellite-based timing reference. In one aspect, a wireless communication system includes a radio access network comprising a plurality of base stations to provide radio access to wireless mobile stations. Each base station includes a positioning signal receiver that receives a satellite-based positioning signal that provides a satellite-based timing signal. This system includes a gateway providing communications between the radio access network and a core network; and a femto base station that provides radio access to wireless mobile stations and is in wireless communications with one or more base stations of the radio access network. The femto base station is in communication with the gateway to access the core network. The femto base station includes a receiver module that acquires wireless signals from the one or more base stations and one or more other femto base stations, processes the acquired wireless signals to extract timing information from the acquired wireless signal, and selects the extracted timing information in one of the acquired wireless signals to be a timing reference for the femto base station to synchronize with the wireless communication system, without directly using a timing reference in a satellite-based positioning signal.

In another aspect, a method for providing a timing reference to a femto base station (Femto BS) in wireless communications in a wireless network includes operating the Femto BS to acquire wireless signals from adjacent cells in the wireless network; processing the acquired wireless signals from adjacent cells to extract timing information from the acquired wireless signal; and selecting the extracted timing information in one of the acquired wireless signals to be a timing reference for the Femto BS to synchronize with the wireless network, without directly using a timing reference in a satellite-based positioning signal.

In another aspect, a method for providing a timing reference to a femto base station (Femto BS) in wireless communications in a Code Division Multiple Access (CDMA) network includes operating the Femto BS to acquire CDMA signals from adjacent cells in the CDMA network; and processing the acquired CDMA signals from adjacent cells to produce a timing reference for the Femto BS to synchronize with the CDMA network.

In another aspect, a method for providing a timing reference to a femto base station (Femto BS) in wireless communications in a Code Division Multiple Access (CDMA) network includes operating a CDMA mobile station (MS) receiver in the Femto BS to perform acquisition of CDMA signals from adjacent cells in the CDMA network while turning off a CDMA base station modem in the Femto BS; turning on and operating the Femto BS modem and associated RF circuitry after the CDMA MS receiver has acquired CDMA signals from adjacent cells; and processing the acquired CDMA signals from adjacent cells to produce a timing reference for the Femto BS to synchronize with the CDMA network.

In yet another aspect, a method for providing a timing reference to a femto base station (Femto BS) in wireless communications in a Code Division Multiple Access (CDMA) network includes operating a CDMA Mobile Station (MS) receiver in the Femto BS to provide receiving functions in the Femto BS; using the CDMA MS receiver to search and acquire CDMA signals from adjacent cells on at least one CDMA channel in one frequency band; selecting a CDMA signal from the adjacent cells with Pilot PN Offset of the earliest timing shift to be the timing reference for the Femto BS; operating the Femto BS to monitor the CDMA signals from adjacent cells in the CDMA network to update the timing reference; creating a virtual Femto BS from the timing reference provided by CDMA MS receiver at the position of the distance equal to a referenced BS in an adjacent cell in the CDMA network to support handoffs between cells in the CDMA network and the Femto cells or amongst Femto cells as normal handoffs; and using the Femto BS with CDMA MS receiving function to provide timing reference relay so that the Femto BS and one or more other femto base stations form a timing reference network that is self synchronized to a single timing source.

These and other aspects and various implementations are described in greater detail in the drawing, the description and the claims.

DETAILED DESCRIPTION

In various wireless networks such as CDMA2000 or Wideband Code Division Multiple Access (WCDMA), a Base Station is often equipped with a satellite-based positioning signal receiver, such as the Global Positioning System (GPS) receiver, and the GPS receiver is used to provide the timing reference for the internal hardware and software synchronization within the network. In the Femto cell environment, such as homes or offices, the GPS signals may be very weak or even not available at a femto cell. Thus Femto BS may not be able to rely on the GPS signal to provide the timing reference. This lack of GPS timing may cause synchronization problem in a Femto cell network, and may lead to difficulty in inter-network handoff with macro cells and other issues in connection with the timing reference.

In many environments, such as areas inside of buildings or underground premises, GPS signals may be too weak to be acquired by the built-in GPS receiver. The wireless signals from macro cells or other Femto cells, however, may be available. This application presents a new approach to use these wireless signals from adjacent cells to provide timing reference for Femto cell synchronization under this situation. With a proper hardware and software functions installed, the femto BS would receive CDMA signals from the adjacent macro or other femto cells and provide self timing synchronization.

Apparatus, techniques and systems described in this document can be used to receive CDMA signals from adjacent cells and use such received CDMA signals to provide the timing reference to a femto base station without relying on the GPS timing signal. This technique provides an alternative approach of timing synchronization to GPS timing. The techniques described in this document can be applicable to femto cells in various wireless networks, such as WCDMA, High-Speed Downlink Packet Access (HSDPA), High-Speed Uplink Packet Access (HSUPA), High Speed Packet Access (HSPA), Ultra Mobile Broadband (UMB) and Long Term Evolution (LTE).

Figure 1:
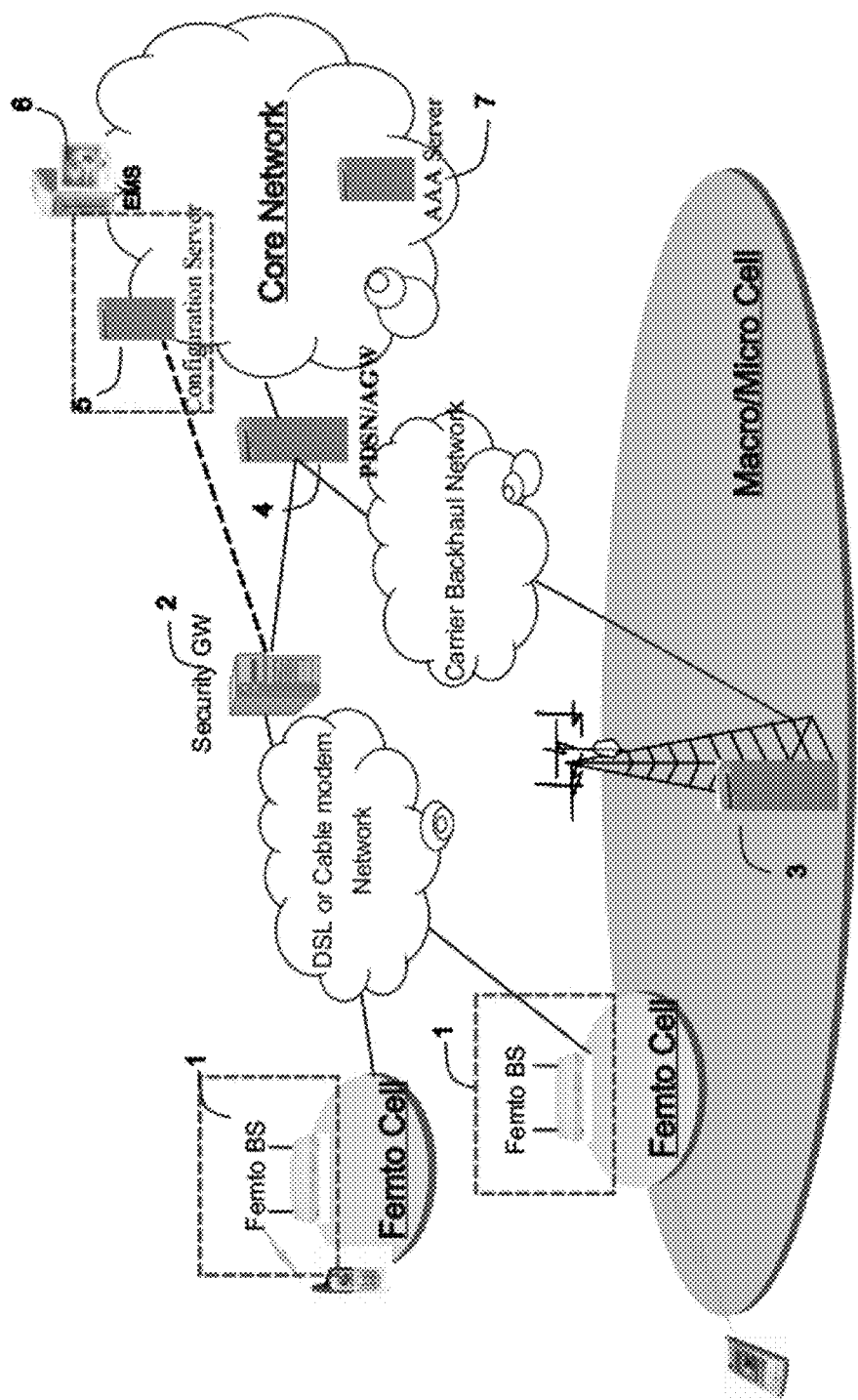
FIG. 1 shows an example of a Femto Cell Network Architecture based on Code Division Multiple Access (CDMA).

CDMA Network Architecture Providing Timing Synchronization with Adjacent CDMA Cells FIG. 1 illustrates an example of a Femto cell network architecture. In this example, the femto cell network includes one or more Femto Base Stations (FBSs) or Femto Access Points (FAPs) 1, a Security Gateway 2, one or more Macro or micro Base Stations 3, an access gateway (AGW) 4, a Femto Cell Configuration Server 5, a network management system 6 such as Enhanced Messaging Service (EMS) and other functions, and Authentication, Authorization and accounting (AAA) Server 7. An FBS 1 can provide over the air connection to the mobile terminals using CDMA2000 specification in this example. The Femto cell may provide a limited coverage area, like in home or small office area, and may be deployed stand-alone without overlay with macro cells, or may overlay with macro cell coverage. A FBS 1 is connected to the Core Network through the Security Gateway 2 over a DSL or Cable Modem IP network. The Macro or micro Base Stations 3 is a CDMA base station within a radio access network and provides over the air connection to mobile stations in a coverage area of the macro or micro cell of the BS 3. The coverage of BS 3 may overlap with a Femto cell in some cases and may be spatially separated from a femto cell in other cases. The AGW 4, which may be integrated with a Packet Data Serving Node (PDSN), provides various gateway functions to the CDMA Packet Data Service Core Network. The Femto Cell Configuration Server 5 is a functional entity used to configure and manage one or more Femto base stations 1 in the network. The Femto cell configuration server 5 may include the functions such as FBS operation authentication and authorization, GPS positioning assistance, FBS provisioning, and fault and performance network management.

Figure 2:
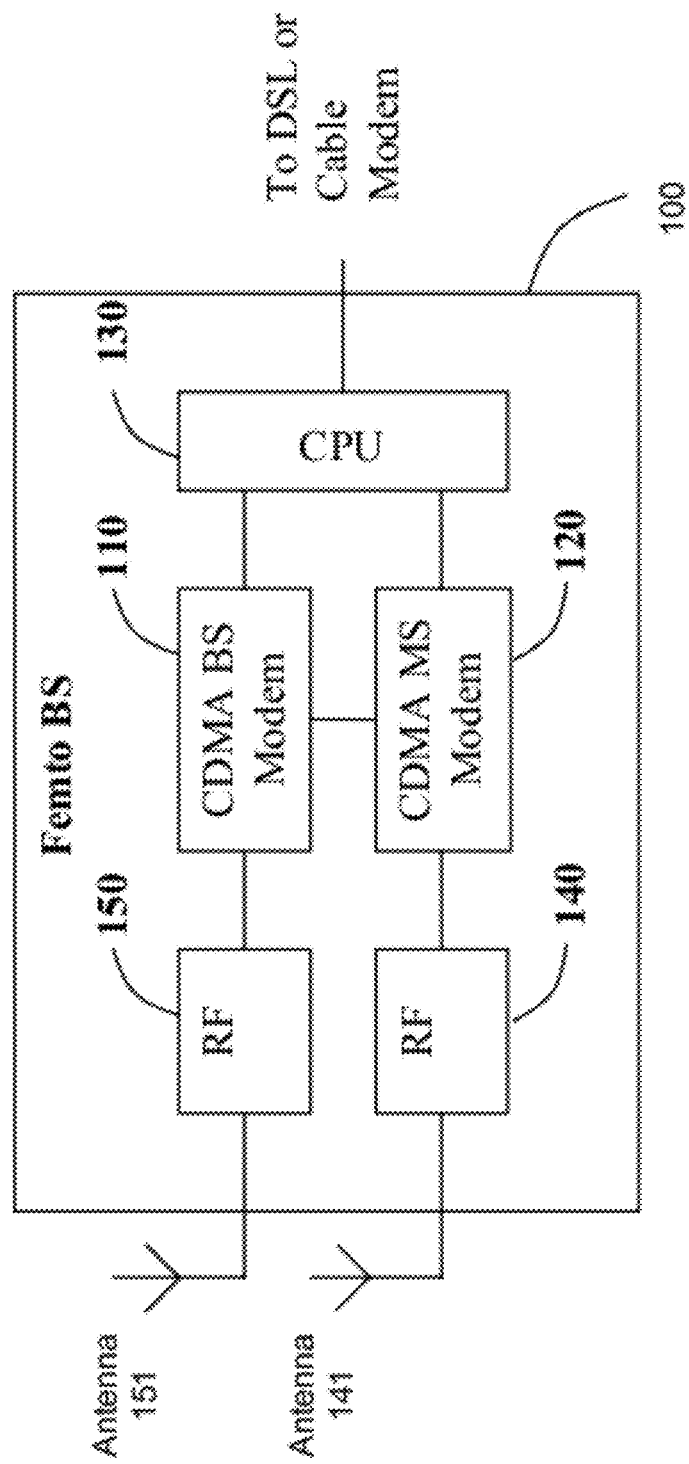
FIG. 2 shows an example of a relevant portion of such a FBS1 for Femto BS timing synchronization via CDMA signals from adjacent cells.

Notably, a FBS 1 in FIG. 1 is equipped to process adjacent CDMA signals to provide BS timing synchronization without GPS timing reference. FIG. 2 shows an example of a relevant portion of such a FBS1 for Femto BS timing synchronization via adjacent CDMA signals. In this example, a Femto base station 100 includes a CDMA base station modem 110, which is used to provide the base station baseband processing functions defined by CDMA air interface standards. In one implementation, the CDMA base station modem 110 may be used to perform the same functionalities as a traditional CDMA base station modem. An associated RF circuit block 150 is provided between an antenna 151 and the CDMA BS modem 110 to process the outgoing RF signals to the antenna 151. A CDMA mobile station (receiving) modem 120 and associated RF circuits 140, are provided to process RF signals received from or transmitted out of another antenna 141, such as signals from or to mobile stations. The receiving modem 120, working as mobile station forward link receiver, is used to monitor and acquire CDMA signals from adjacent macro cells or other Femto cells. This CDMA MS modem 120 and associated RF circuits 140 could be set to be able to monitor or listen to any CDMA channel in any standardized frequency band and to provide the timing reference to CDMA BS modem 110, other hardware and software after it locks to CDMA signals from adjacent cells. With this function, the FBS 100 is capable of self-detecting and self-adjustment of timing reference. In one implementation, the CDMA MS receiving function 120 can be a stand-alone module in the Femto BS 100. In another implementation, the CDMA MS receiving function 120 can be a component built into the CDMA BS modem 110. The Femto base station 100 can also includes a CPU 130 which provides the signal processing functions and controls the interface to the DSL or cable modem network as shown in FIG. 1.

Algorithm of Timing Synchronization with Adjacent CDMA Cells

Figure 3:
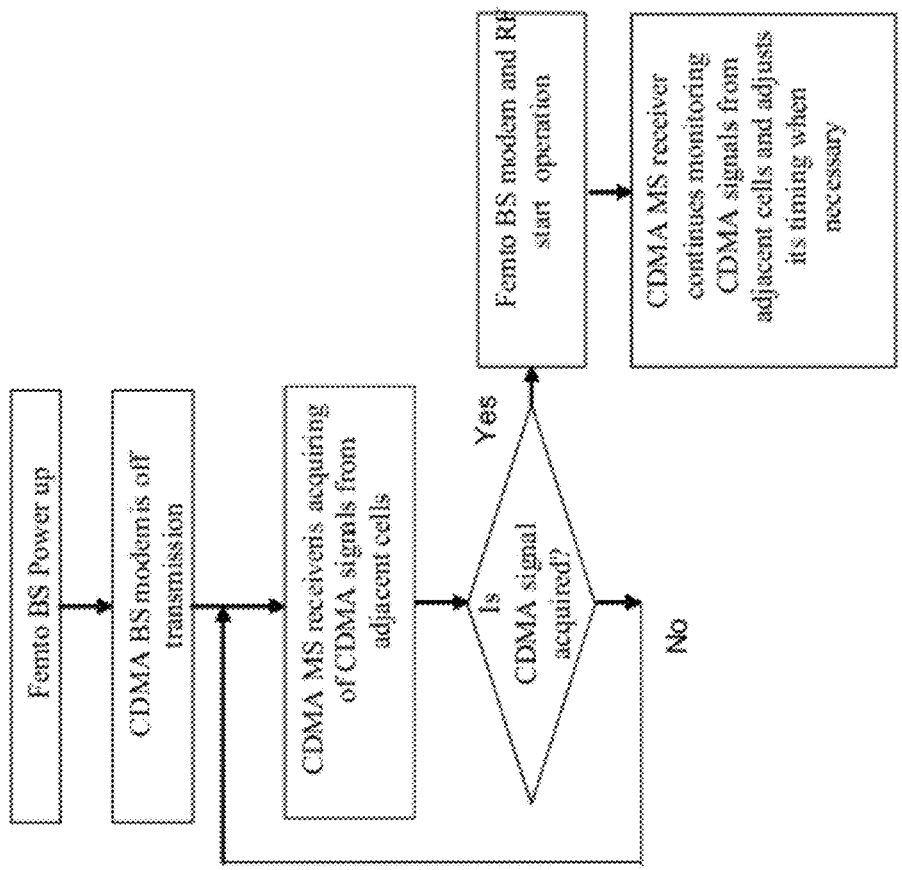
FIG. 3 shows an example of a timing synchronization process based a CDMA signal received from an adjacent cell.

FIG. 3 illustrates an exemplary operational flow of the Femto BS 100. In operation, after the Femto BS 100 is powered up, the CDMA BS modem 110 and its associated RF circuits 150 are initially set in an OFF state and do not transmit a CDMA signal over the air. The CDMA MS receiver 120 starts searching and acquiring CDMA signals from adjacent macro cells or other Femto cells in any available CDMA channel at a frequency band specified by CDMA2000 specification. The CDMA signals include signals from Pilot channel, SYNC channel, Paging channel, Common Control Channel, Common Broadcast Channel or Control Channel which depends on the technologies of IS-95, CDMA2000 or HRPD. The procedure of pilot acquisition used by the CDMA MS receiver 120 can be implemented based on a suitable process, such as the procedure used for an existing CDMA mobile system acquisition procedure defined in 3GPP2 air interface standards.

In operation, after the CDMA MS receiver 120 acquires a Pilot signal from macro or micro cells or other Femto cells, the CDMA MS receiver 120 locks to the Pilot and gets the timing information from received CDMA SYNC channel or other overhead channels. Once the CDMA MS receiver 120 gets the correct information from the overhead messages, the CDMA MS receiver 120 adjusts its timing clock and generates the timing reference for the Femto BS 100. With the other information received from overhead message, the Femto BS 100 may communicate with the Configuration Server 5 in FIG. 1 for the authentication and authorization for the femto BS. Next, the Femto BS modem 110 sets its timing to align with the timing reference from the CDMA MS receiver 120. In the multi-paths environment with multiple signals, the timing reference can be based on the stable signal with the earliest time offset.

In CDMA systems, the Pilot PN sequence repeats itself every 80 ms at paging frame boundary. Therefore, there may not be a need to decode SYNC channel to get system time information, if the Femto BS 100 can get rough timing resolution from an Internet Timing source using the Network Time Protocol (NTP) through the CPU 130 controlled ADSL. The Internet Timing may provide the timing accuracy within 10 ms, which may be sufficient for the CDMA MS receiver 120 to calculate the PN Offset and paging frame boundary.

After the CDMA MS receiver 120 provides the timing reference, the CDMA BS modem 110 and its associated RF circuits 150 may be turned on to transmit signals over the air to provide wireless access to mobile stations. Based on the measurement of surrounding pilot signals by the CDMA MS receiver 120, the Femto BS 100 may self determine the CDMA transmission channel of the CDMA BS modem 110 and its RF circuit 150. The Femto BS 100 may report this measurement information to the Femto Network Configuration Server 5 and wait for the decision on the transmission channel from the Configuration Server 5. The over the air transmit signals may be on the same frequency channel as adjacent CDMA cells or may be on a different frequency channel, depending on the Femto network configuration.

The CDMA MS receiver 120 may be operated to monitor the CDMA signals from adjacent cells at selected times to maintain the timing synchronization with the network. The CDMA MS receiver can be operated to continue monitoring CDMA signals from adjacent cells after the CDMA MS receiver has acquired CDMA signals from adjacent cells and the timing reference is generated. The generated timing reference from the monitored CDMA signals from adjacent cells can be adjusted or regenerated after the synchronization with the CDMA network based on a previously generated timing reference is lost.

The monitoring can be performed periodically or in a non-periodic manner depending on the operating conditions. For example, if monitored CDMA signals of adjacent cells are on the same CDMA channel as the Femto BS 100, the transmission of CDMA BS 110 may cause interference to the CDMA MS receiver 120 and thus may cause improper operation of this monitoring function. To avoid this situation, the CDMA MS receiver 120 may perform the monitoring operation when there is no communication traffic at the Femto BS 100, e.g., the Femto BS 100 is an idle state. The communication traffic at the Femto BS 100 can be monitored and a control mechanism can be implemented to activate the monitoring operation for the timing reference when the traffic is off. As an example, the monitored signal is monitored to determine whether it is on the same CDMA channel and band as the Femto BS and, if the monitored signal is on the same CDMA channel and band as the Femto BS, the monitoring period is then set at an idle state of the Femto BS.

In another technique for reducing the above interference, the Femto BS modem 110 and its RF circuit module 150 may be controlled to temporally turn off transmission during the short monitoring period of the CDMA MS receiver 120. The monitoring operations can be set at a low traffic period to reduce the impact to the wireless traffic via the Femto BS 100 caused by turning off the transmission.

Yet another approach to reducing the interference is to reset the monitoring CDMA signals from adjacent cells on CDMA channels/frequency bands that are different from a frequency band at which Femto BS 100 is operating, if available. In this case, the CDMA BS modem 110 and RF module 150 may not need to shut down transmission, while the CDMA MS receiver 120 and RF module 140 are receiving and monitoring adjacent cell continuously.

A CDMA cell uses a Pilot PN code to distinguish with other cells. The Pilot PN code is broadcast in the Neighbor List Message or System Parameter Message. After locked to one CDMA cell, the CDMA MS receiver 120 may search for other Pilot PNs from adjacent cells. The CDMA MS receiver 120 can be designed not to include in its searching and monitoring list the pilot PN used by the CDMA BS modem 110 of the Femto BS 100.

The CDMA MS receiver 120 can calculate its relative propagation delay between the newly detected Pilot and its reference timing based on the Pilot PN code in the Neighbor List Message and the detected pilot signal. For example, if a base station is one kilometer closer to the Femto BS 100 than the base station which the Femto BS 100 is currently locking into, the CDMA MS receiver 120 of the Femto BS 100 can detect its pilot PN about 4.2 chips earlier than supposed to be if the timing reference of the detected base station is aligned with GPS timing. If there is a timing difference between the timing reference of the detected base station and the GPS timing, this timing difference would be reflected into the earliest PN Offset measurement by the CDMA MS receiver 120 of Femto BS 100.

The timing reference generated from CDMA MS receiver 120 should be adjusted based on shortest path algorithm. If the new detected pilot signal is stable and has a shorter delay, CDMA MS receiver 120 can adjust the timing reference aligning to that CDMA pilot when the timing difference is greater than a pre-configured threshold or a threshold set by the network.

If the CDMA MS receiver 120 loses its currently locked CDMA signal for a given period of time, the CDMA MS receiver 120 can be operated to search for and lock to another available CDMA signals from adjacent cells and set the timing reference to the newly locked stable CDMA pilot with the shortest delay. If there is no other CDMA signal available from the surrounding area, the CDMA MS receiver 120 may be operated to provide a free-running timing reference generated from a highly stable clock.

Virtual Femto BS Position and Timing Reference Relay

The above technique for obtaining a timing reference based on CDMA signals from adjacent cells provides each Femto BS 100 with its own timing relative to an adjacent base station or femto cell, e.g., the closest adjacent base station. This timing reference generated by the CDMA MS receiver 120 might be shifted from the GPS timing reference due to the transmission delay of the CDMA signal from adjacent cells to the Femto BS 100. This timing shift in the PN offset produces a global shift in timing for the communications via the Femto BS 100 and do not adversely affect the handoff functions and communication performance of the Femto BS 100.

Figure 4:
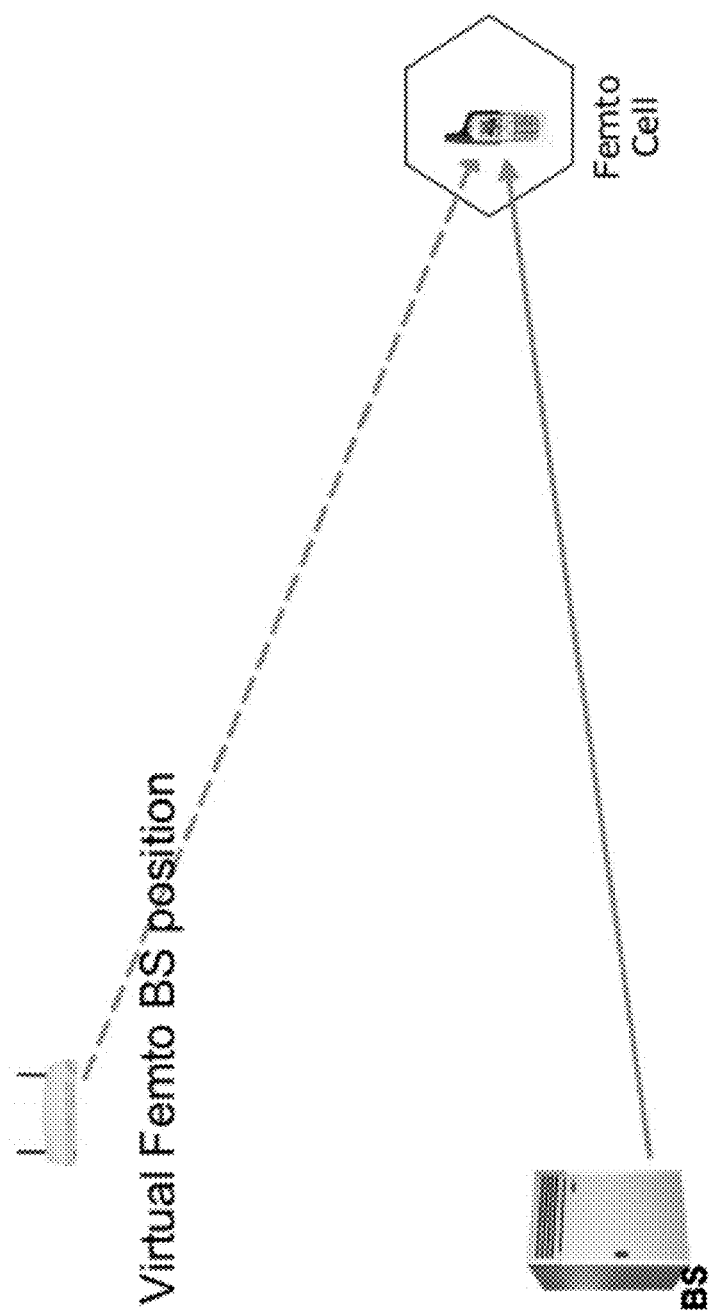
FIG. 4 illustrates a virtual Femto BS position with respect to a macro base station due to the timing difference between the GPS timing reference and the timing reference acquired via a CDMA signal from the macro base station.

This timing shift in the PN offset renders the Femto BS to appear at a virtual position different from its actual location by a distance equal to the transmission delay. FIG. 4 illustrates an actual position of a Femto BS station and its virtual Femto BS position with respect to a macro BS. The timing reference of the Femto BS should be aligned with the GPS timing reference from the macro cell. This would not impact on the handoff functions and performances even when the shift is beyond the CDMA standard requirement. There may not need to compensate the propagation delay in the timing reference.

The above described Femto BS with the CDMA MS receiver function may be used for the timing reference relay in addition to providing timing reference. For example, the macro BS CDMA signal, which is aligned to the GPS timing reference, may serve as the initial timing source in the timing reference relay. Its adjacent Femto BSs (timing relay stations) could provide a relative timing reference to the other Femto BSs adjacent to it. As result, all Femto BSs within a macro cells coverage area would form a timing reference network by themselves and be virtually synchronized to the GPS timing at the macro BS location. All the CDMA signals transmission from Femto BSs within the macro cell coverage would be similarly equivalent to the transmission from the position of the macro BS. It has same result for receiving signals on the reverse links. The Femto BS can be operated to boost its transmit power to help adjacent Femto BS to acquire CDMA timing.

One implementation of the above described features is to build the MS receiver in the Femto BS for providing the timing reference from the CDMA signals from adjacent cells in the CDMA network and to allow the Femto BS to perform self detection and adjustment of the timing reference obtained from the CDMA signals from adjacent cells in the CDMA network. This implementation can be used to avoid the need to consider various operating conditions, e.g., the transmission distance impact. For example, under an existing CDMA standard, the BS timing difference to the GPS timing reference should be less than 3 μs and cannot exceed a maximum timing difference limit of 10 μs. The present technique does not need to adjust the BS timing to be equal to the GPS timing reference and the present technique lets each Femto BS maintain a timing difference to the GPS timing based on the distance. This can be done using the earliest timing offset adjustment algorithm. The handoff can work properly even when the timing reference difference with the GPS timing reference is larger than the requirement under existing CDMA standard.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations are disclosed. Variations, modifications and enhancements to the described implementations, and other implementations may be made based on what is disclosed.

What is claimed is:

1. A method for providing a timing reference to a femto base station (Femto BS) in wireless communications in a Code Division Multiple Access (CDMA) network, comprising:

operating a CDMA Mobile Station (MS) receiver in the Femto BS to provide receiving functions in the Femto BS;

using the CDMA MS receiver to search and acquire CDMA signals from adjacent cells on at least one CDMA channel in one frequency band;

selecting a CDMA signal from the adjacent cells with Pilot Pseudorandom Noise (PN) Offset of an earliest timing shift to be a timing reference for the Femto BS;

operating the Femto BS to monitor the CDMA signals from adjacent cells in the CDMA network to update the timing reference;

supporting a handoff between cells in the CDMA network and the Femto BS using a virtual Femto BS at a position different from an actual location of the Femto BS by a distance equal to a transmission delay from base station of the cell having the earliest timing shift; and using the Femto BS to provide timing reference relay so that the Femto BS and one or more other femto base stations form a timing reference network that is synchronized to a single timing source.

2. The method as in claim 1, comprising:
operating the Femto BS to boost its transmit power to help adjacent Femto BS to acquire CDMA timing.

3. The method as in claim 1, comprising:
detecting whether the monitored signal is on the same CDMA channel and band as the Femto BS; and
if the monitored signal is on the same CDMA channel and band as the Femto BS, operating the Femto BS to monitor the CDMA signals from adjacent cells at an idle state of the Femto BS.

4. The method as in claim 1, comprising:
operating the Femto BS to turn off the transmission during the monitoring of the CDMA signals from adjacent cells.

5. The method as in claim 1, comprising:
setting the Femto BS to operate at an operating channel and a frequency band to be different from the operating channel and the frequency band under monitoring by the CDMA MS receiver.

6. A method for providing a timing reference to a femto base station (Femto BS) in wireless communications in a Code Division Multiple Access (CDMA) network, comprising:

operating a CDMA mobile station (MS) receiver in the Femto BS to perform acquisition of CDMA signals from adjacent cells in the CDMA network while turning off a CDMA base station modem in the Femto BS;

turning on and operating the Femto BS modem and associated RF circuitry after the CDMA MS receiver has acquired CDMA signals from adjacent cells; and processing the acquired CDMA signals from adjacent cells to produce a timing reference for the Femto BS to synchronize with the CDMA network.

7. The method as in claim 6, comprising:
    operating CDMA MS receiver to continue monitoring CDMA signals from adjacent cells after the CDMA MS receiver has acquired CDMA signals from adjacent cells and the timing reference is generated; and
    adjusting the generated timing reference from the monitored CDMA signals from adjacent cells after the synchronization with the CDMA network based on a previously generated timing reference is lost.

8. A method for providing a timing reference to a femto base station (Femto BS) in wireless communications in a wireless network, comprising:
    operating the Femto BS to acquire wireless signals from adjacent cells in the wireless network;
    processing the acquired wireless signals from adjacent cells to extract timing information from the acquired wireless signal;
    selecting the extracted timing information in one of the acquired wireless signals to be a timing reference for the Femto BS to synchronize with the wireless network, without directly using a timing reference in a satellite-based positioning signal; and
    supporting a handoff to and from the Femto BS based on a virtual Femto BS at a position different from an actual location of the Femto BS by a distance equal to a transmission delay from a base station of the one of the acquired wireless signals selected to be the timing reference.

9. The method as in claim 8, wherein the wireless network is a Code Division Multiple Access (CDMA) network.

10. The method as in claim 8, wherein the wireless network is a Wideband Code Division Multiple Access (WCDMA) network.

11. The method as in claim 8, wherein the wireless network is a High-Speed Downlink Packet Access (HSDPA) network.

12. The method as in claim 8, wherein the wireless network is a High-Speed Uplink Packet Access (HSUPA) network.

13. The method as in claim 8, wherein the wireless network is a High Speed Packet Access (HSPA) network.

14. The method as in claim 8, wherein the wireless network is a Ultra Mobile Broadband (UMB) network.

15. The method as in claim 8, wherein the wireless network is a Long Term Evolution (LTE) network.

16. The method as in claim 8, wherein the selected one of the acquired wireless signals is from the closest cell adjacent to the Femto BS.

17. The method as in claim 8, comprising:
    operating the Femto BS to turn off the transmission during acquiring the wireless signals from adjacent cells to obtain the timing reference; and
    resuming transmission of the Femto BS after the wireless signals from adjacent cells for the timing reference are acquired.

18. The method as in claim 8, wherein the Femto BS is operated to acquire the wireless signals from adjacent cells to obtain the timing reference when there is no communication traffic at the Femto BS.

19. The method as in claim 8, comprising:
    operating the Femto BS and one or more other femto base stations to form a timing reference network that is self synchronized to a single timing source.

20. A wireless communication system, comprising:
    a radio access network comprising a plurality of base stations to provide radio access to wireless mobile stations, each base station comprising a positioning signal receiver that receives a satellite-based positioning signal that provides a satellite-based timing signal;
    a gateway providing communications between the radio access network and a core network; and
    a femto base station that provides radio access to wireless mobile stations and is in wireless communications with one or more base stations of the radio access network, the femto base station in communication with the gateway to access the core network,
    wherein the femto base station comprises a receiver module that acquires wireless signals from the one or more base stations and one or more other femto base stations, processes the acquired wireless signals to extract timing information from the acquired wireless signal, and selects the extracted timing information in one of the acquired wireless signals to be a timing reference for the femto base station to synchronize with the wireless communication system, without directly using a timing reference in a satellite-based positioning signal.

21. The system as in claim 20, wherein the femto base station comprises:
    a mechanism to turn off the transmission of the femto base station for communications with one or more mobile stations during acquiring the wireless signals from to obtain the timing reference and to resume transmission of the femto base station after the wireless signals from adjacent cells for the timing reference are acquired.

22. The system as in claim 20, wherein the femto base station comprises:
    A mechanism that controls the femto base station to acquire the wireless signals obtain the timing reference when there is no communication traffic at the femto base station for communicating with one or more mobile stations.

* * * * *